(12) United States Patent
Huang et al.

(10) Patent No.: US 12,328,517 B2
(45) Date of Patent: Jun. 10, 2025

(54) IMAGE SENSOR AND DRIVING METHOD THEREOF

(71) Applicant: AUO Corporation, Hsin-Chu (TW)

(72) Inventors: Jeng-Yi Huang, Hsin-Chu (TW);
Yen-Yu Chen, Hsin-Chu (TW);
Chao-Yi Hsu, Hsin-Chu (TW);
Tsung-Hsien Hsieh, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 420 days.

(21) Appl. No.: 17/885,891

(22) Filed: Aug. 11, 2022

(65) Prior Publication Data

US 2023/0345140 A1 Oct. 26, 2023

(30) Foreign Application Priority Data

Apr. 26, 2022 (TW) ................. 111115908

(51) Int. Cl.
*H04N 25/40* (2023.01)
*H04N 25/42* (2023.01)
*H04N 25/44* (2023.01)
*H04N 25/443* (2023.01)
*H04N 25/531* (2023.01)
*H04N 25/71* (2023.01)
*H04N 25/74* (2023.01)
(Continued)

(52) U.S. Cl.
CPC ............. *H04N 25/42* (2023.01); *H04N 25/40* (2023.01); *H04N 25/44* (2023.01); *H04N 25/443* (2023.01); *H04N 25/531* (2023.01); *H04N 25/74* (2023.01); *H04N 25/745* (2023.01); *H04N 25/75* (2023.01); *H04N 25/766* (2023.01); *H04N 25/7795* (2023.01); *H04N 25/78* (2023.01)

(58) Field of Classification Search
CPC ........ H04N 25/30; H04N 25/40; H04N 25/42; H04N 25/44; H04N 25/443; H04N 25/531; H04N 25/533; H04N 25/74; H04N 25/745; H04N 25/75; H04N 25/766; H04N 25/7795; H04N 25/78; A61B 6/03; A61B 6/503; A61B 6/504; A61B 6/51; A61B 6/545
See application file for complete search history.

(56) References Cited

U.S. PATENT DOCUMENTS 8,102,450 B2 * 1/2012 Masuyama .......... H04N 25/445
250/214 R
2007/0279503 A1 12/2007 Totsuka
(Continued)

FOREIGN PATENT DOCUMENTS

CN 106308834 A 1/2017
CN 108184072 A 6/2018
(Continued)

*Primary Examiner* — Lin Ye
*Assistant Examiner* — Chriss S Yoder, III
(74) *Attorney, Agent, or Firm* — WPAT, PC

(57) ABSTRACT

The disclosure provides a driving method. The driving method includes following steps. During a normal scan period, a part of drivers provide first control signals generated according to a first clock frequency to target gate lines included in a part of gate line groups. During a high scanning period, the part of drivers provide second control signals generated according to a second clock frequency to residual gate lines included in the part of gate line groups.

15 Claims, 13 Drawing Sheets

(51) Int. Cl.
*H04N 25/75* (2023.01)
*H04N 25/76* (2023.01)
*H04N 25/766* (2023.01)
*H04N 25/78* (2023.01)

(56) References Cited

U.S. PATENT DOCUMENTS

2015/0009371 A1* 1/2015 Araoka .............. H04N 25/7795
  348/262
2018/0205886 A1  7/2018 Lee
2021/0398472 A1  12/2021 Kim

FOREIGN PATENT DOCUMENTS

| CN | 110085173 A | 8/2019 |
| JP | 2007300467 A | 11/2007 |
| KR | 20180084241 A | 7/2018 |
| TW | 202113779 A | 4/2021 |
| TW | 202201378 A | 1/2022 |

* cited by examiner ial Number 111115908, filed Apr. 26, 2022, which is
IMAGE SENSOR AND DRIVING METHOD THEREOF

CROSS-REFERENCE TO RELATED APPLICATION

This application claims priority to Taiwan Application Serial Number 111115908, filed Apr. 26, 2022, which is herein incorporated by reference in its entirety.

BACKGROUND

Field of Invention

The present invention relates to an image sensor. More particularly, the present invention relates to an image sensor with high speed scan functions and driving method therefore.

Description of Related Art

In nowadays image sensing techniques, with the widely used of the X ray dynamic image, how to provide more realistic image for user to evaluate is an important issue in this field.

SUMMARY

To achieve the aforesaid purpose, one aspect of the present disclosure is related to a driving method. The driving method is to drive an image sensor. The image sensor includes a plurality of gate line groups and a plurality of drivers respectively corresponding to the gate line groups. Each of the gate line groups comprises a plurality of gate lines. Each of the drivers is configured to provide control signals to gate lines comprised in a corresponding one of the gate line groups. The driving method includes the following steps. During a normal scan period under a high frame rate mode, a plurality of first control signals are generated by a part of the drivers according to a first clock rate to a plurality of target gate lines comprised in a part of the gate line groups. During a high speed scan period under the high frame rate mode, a plurality of second control signals are generated by the part of the drivers according to a second clock rate to a plurality of residual gate lines comprised in the part of the gate line groups, wherein the first clock rate is less than the second clock rate.

Another aspect of the present disclosure is related to a driving method. The driving method is to drive an image sensor. The image sensor includes a plurality of gate line groups and a plurality of drivers respectively corresponding to the gate line groups. Each of the gate line groups comprises a plurality of gate lines. Each of the drivers is configured to provide control signals to gate lines comprised in a corresponding one of the gate line groups. The driving method includes the following steps. During a normal scan period under a high frame rate mode, a plurality of first control signals are generated by a part of the drivers according to a first clock rate to a plurality of target gate lines comprised in a part of the gate line groups. During a high speed scan period under the high frame rate mode, a plurality of third control signals are generated by the other part of the drivers according to a second clock rate to a plurality of gate lines comprised in the other part of the gate line groups, wherein the first clock rate is less than the second clock rate.

The other aspect of the present disclosure is related to an image sensor. The image sensor includes an image sensor array and a plurality of drivers. The image sensor array includes a plurality of gate lines. The drivers respectively corresponding to the gate line groups, each of the drivers is configured to provide a plurality of control signals to gate lines comprised in a corresponding one of the gate line groups. During a normal scan period under a high frame rate mode, a part of the drivers generate a plurality of first control signals according to a first clock rate to a plurality of target gate lines comprised in a part of the gate line groups. During a high speed scan period under the high frame rate mode, the part of the drivers generate a plurality of second control signals according to a second clock rate to a plurality of residual gate lines comprised in the part of the gate line groups, wherein the first clock rate is less than the second clock rate.

Summary, in the present disclosure, during the mage sensor operated in the high frame rate mode, a high speed scan are provided to a part of the gate lines in the non-target area, such that the reset operation can performed to the gate lines in the non-target area, so as to increase the frame rate of the output image and the realistic of the image.

BRIEF DESCRIPTION OF THE DRAWINGS

The present invention can be more fully understood by reading the following detailed description of the embodiment, with reference made to the accompanying drawings as follows.

DETAILED DESCRIPTION

Figure 1:
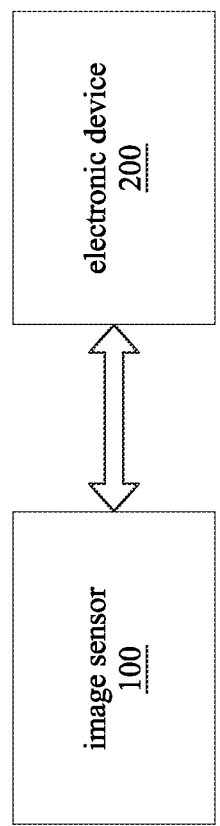
FIG. 1 is a schematic diagram of an image sensor and an electronic device in accordance with one embodiment of the present disclosure.

Reference is made to FIG. 1. FIG. 1 is a schematic diagram of a function block of an electronic device 100 in accordance with one embodiment of the present disclosure. In some embodiments, the image sensor 100 can be implemented by a complementary metal-oxide-semiconductor (COMS) image sensor. In some embodiments, the image sensor 100 can be implemented by a CMOS dynamic X-ray sensor.

In some embodiments, the electronic device 200 can be implemented by a computer, and the computer can include a display screen (not shown), so as to display the image outputted by the image sensor 100 . . . . In some embodiments, the electronic device 200 can instruct the image sensor 100 to operate in a normal mode or a high frame rate mode.

Figure 2:
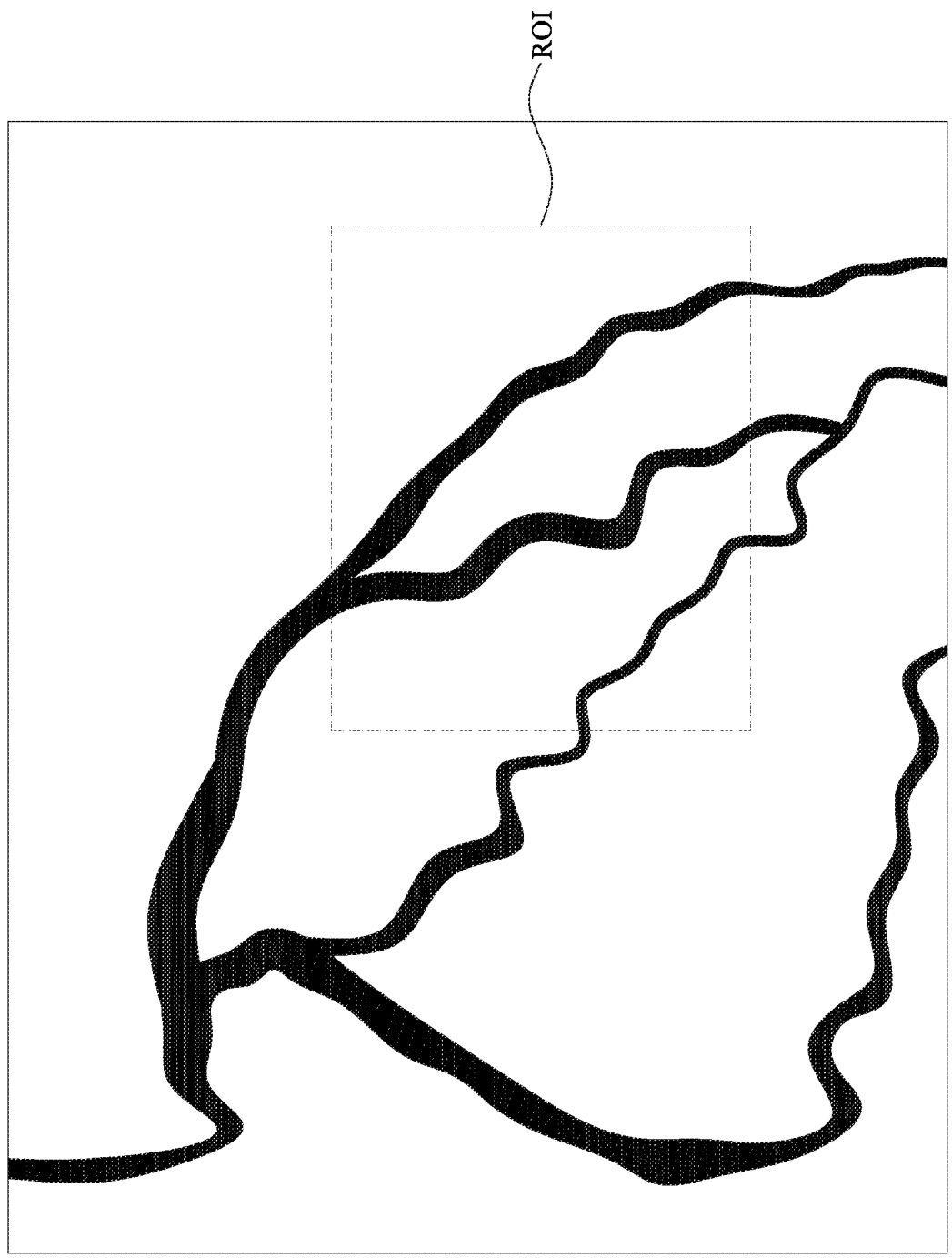
FIG. 2 is a schematic diagram of an image of one frame of the video image outputted by the image sensor in a normal mode in accordance with one embodiment of the present disclosure.

Reference is made to FIG. 2, FIG. 2 is a schematic diagram of an image of one frame of the video image outputted by the image sensor 100 in a normal mode in accordance with one embodiment of the present disclosure. A shown in FIG. 2, the image sensor 100 can be utilized for angiography, visceral angiography or other radiography. In some cases, the first image video image outputted by the image sensor 100 has a frame rate (e.g., 30 Hz, 60 Hz or 80 Hz) similar or less than the human heartbeat rate or human pulse rate, which may cause the first image video image cannot represent the exact changes in the region to be observed (such as, the region in interest ROI as shown in FIG. 2) during the cardiac cycle, arterial/venous beats. In other embodiments, the image sensor 100 can be applied in dental photography or chest X-ray photography. Therefore, it is not intended to limit the present disclosure.

Figure 3:
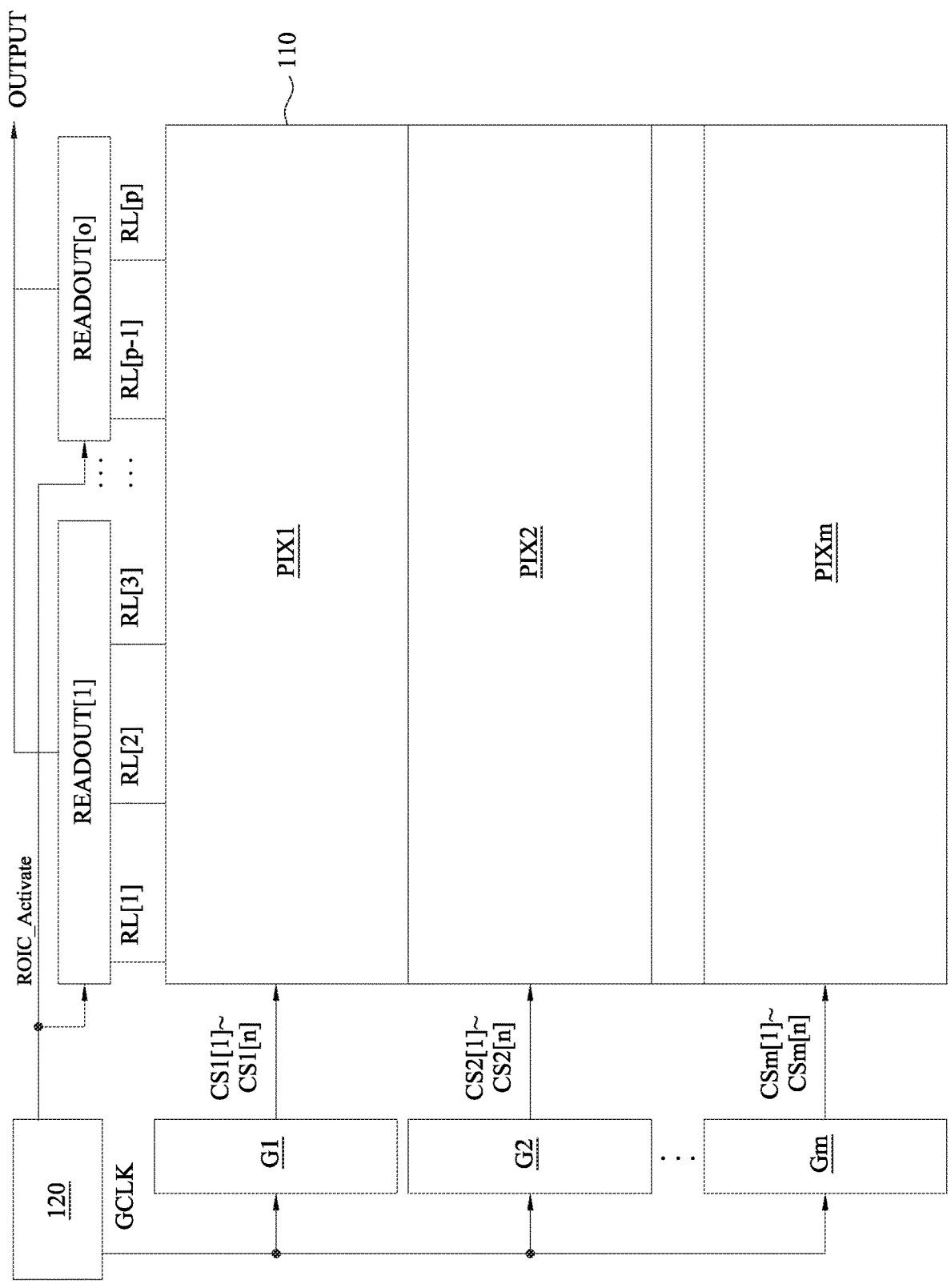
FIG. 3 is a schematic diagram of a function block of the image sensor in accordance with one embodiment of the present disclosure.

Reference is made to FIG. 3, FIG. 3 is a schematic diagram of a function block of the image sensor 100 in accordance with one embodiment of the present disclosure. As shown in FIG. 3, the image sensor 100 includes an image sensor array 110, a timing control circuit 120, drivers G1~Gm and readout circuits READOUT[1]~READOUT[o], wherein the number of "m" said in the driver Gm and the number of "o" said in the readout circuit READOUT[o] can be implemented by any positive integer.

The image sensor array 110 includes pixel circuit groups PIX1~PIXm and read lines RL[1]~RL[p], wherein the number of "p" said in the read line RL[p] can be implemented by any positive integer. The pixel circuit groups PIX1~PIXm respectively correspond to the drivers G1~Gm. The drivers G1~Gm are configured to provide the control signals CS1[1]~CS1[n], CS2[1]~CS2[n] to CSm[1]~CSm[n], respectively. The aforesaid number "n" can be implemented by any positive integer (such as, 128, 256 or 512).

The readout circuits READOUT[1]~READOUT[o] are electrically coupled through the read lines RL[1]~RL[p] to the image sensor array 110, and the readout circuits READOUT[1]~READOUT[o] are configured to receive/detect the voltage variations of the pixel circuits in the image sensor array 110 through the readout circuits READOUT[1]~READOUT[o], so as to output the frame data OUTPUT. In some embodiments, each of the readout circuits READOUT[1]~READOUT[o] includes a correlated double sampling circuit electrically coupled to a corresponding one of the read lines RL[1]~RL[p], so as to obtained/eliminate a difference between the leakage voltage potential and the reset voltage potential of each of the read lines RL[1]~RL[p].

In some embodiments, the timing control circuit 120 is configured to provide the clock signals GCLK to the drivers G1~Gm, so as to control the scan rate of the drivers G1~Gm. In some embodiments, the timing control circuit 120 is configured to provide the enable signal ROIC_Activate to the readout circuits READOUT[1]~READOUT[o], so as to control the readout circuits READOUT[1]~READOUT[o] to perform the readout operation for the pixel circuits included in the image sensor array 110.

Figure 4A:
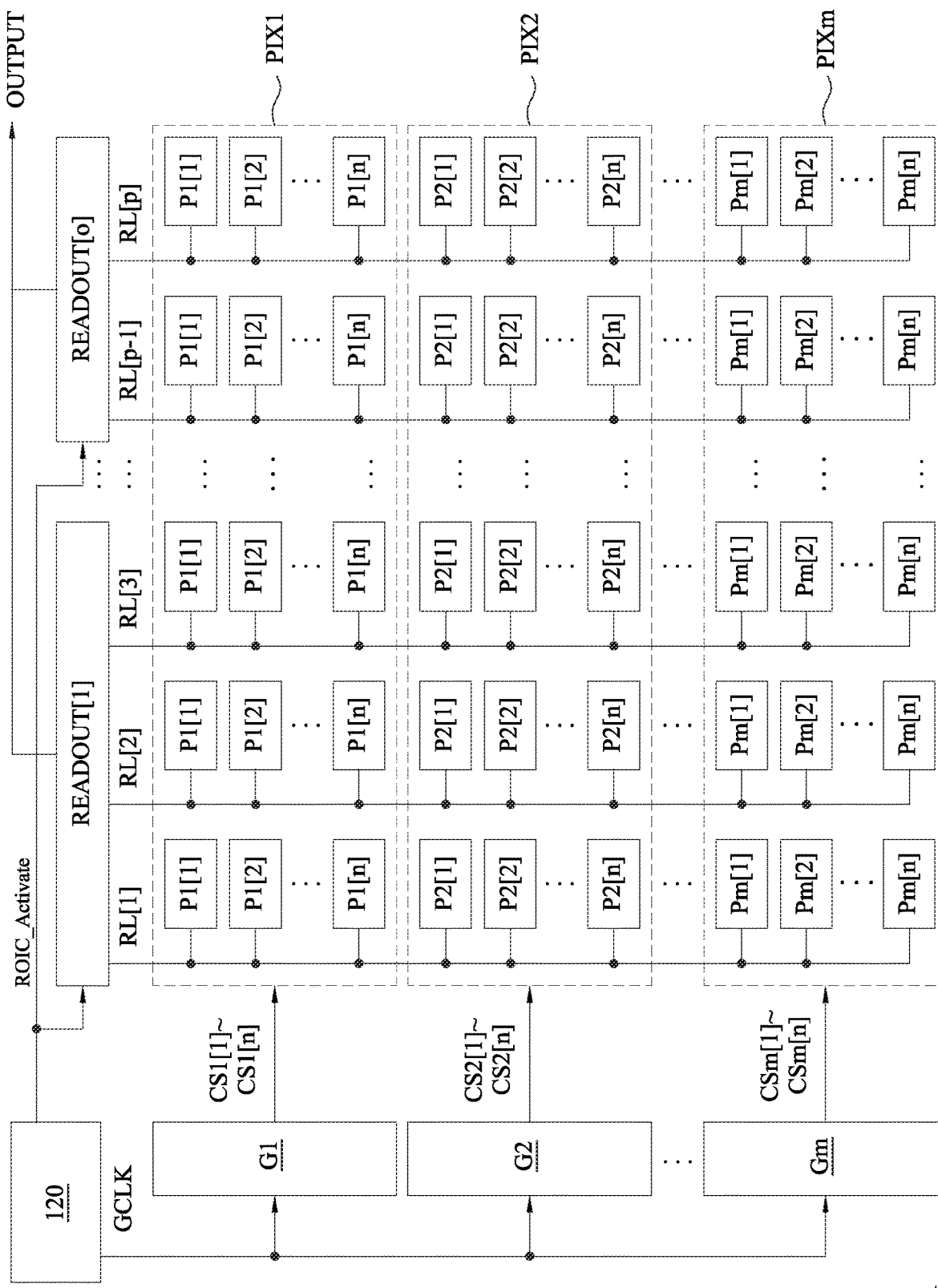
FIG. 4A is a schematic diagram of architecture of the image sensor in accordance with one embodiment of the present disclosure.

Reference is made to FIG. 4A, FIG. 4A is a schematic diagram of architecture of the image sensor 100 in accordance with one embodiment of the present disclosure. As shown in FIG. 4A, the pixel circuits group PIX1~PIXm includes the pixel circuits P1[1]~P1[n], P2[1]~P2[n] to Pm[1]~Pm[n], respectively. The pixel circuits P1[1]~P1[n], P2[1]~P2[n] to Pm[1]~Pm[n] included in the same line are electrically coupled through a corresponding one of the read line RL[1]~RL[p] to one of readout circuits READOUT[1]~READOUT[o].

In this case, if the reset operation is performed for a part of the pixel circuits corresponding to the region in interest ROI instead of all of the pixel circuits, the other pixel circuits without being performed in reset operation may generate the leakage currents in the inner nodes thereof after the exposure, and the leakage currents may be transmitted to the readout circuit READOUT[1] through the corresponding read lines. Therefore, the present disclosure provides a driving method for driving the image sensor 100 to improve the aforementioned issue. The said driving method will be described in detail in the following embodiments.

Figure 4B:
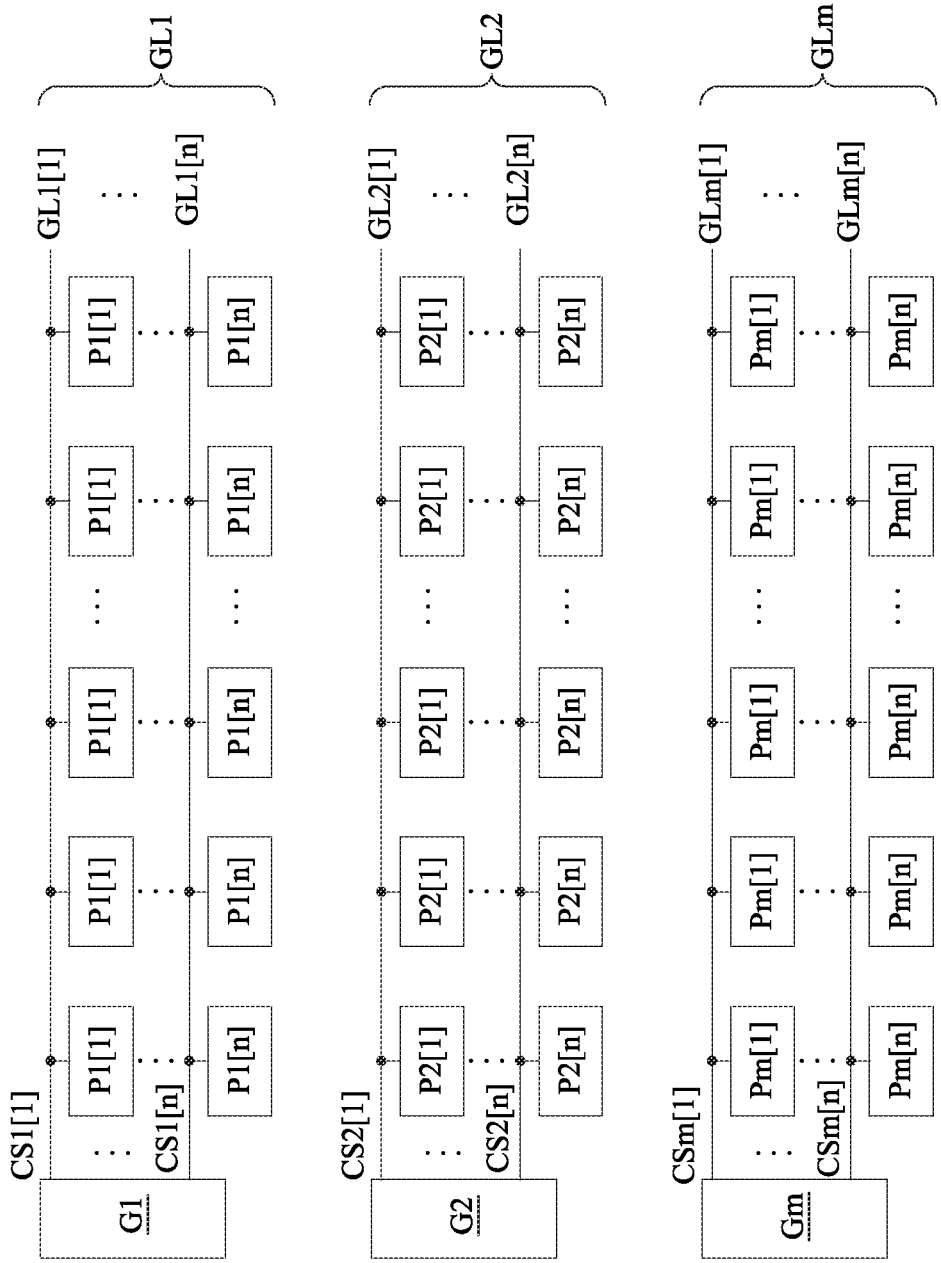
FIG. 4B is a schematic diagram of architecture between drivers, gate line groups and pixel circuits in accordance with one embodiment of the present disclosure.

Reference is made to FIG. 4B, FIG. 4B is a schematic diagram of architecture between drivers G1~Gm, gate line groups GL1~GLm and pixel circuits P1[1]~P1[n] to Pm[1]~Pm[n] in accordance with one embodiment of the present disclosure. A shown in FIG. 4B, the image sensor array 110 includes gate line GL1[1]~GL1[n], GL2[1]~GL2[n] to GLm[1]~GLm[n], and the pixel circuits P1[1]~P1[n], P2[1]~P2[n] to Pm[1]~Pm[n] included in the same line of the image sensor array 110 are electrically coupled through a corresponding one of the gate line GL1[1]~GL1[n] to one of the drivers G1~Gm. The gate line groups GL1~GLm correspond to the drivers G1~Gm, respectively.

Specifically, the pixel circuit P1[1] is electrically coupled through the gate line GL1[1] to the driver G1, so as to receive the control signal CS1[1] through the gate line GL1[1] generated from the driver G1. And so on, the pixel circuit P1[n] is electrically coupled through the gate line GL1[n] to the driver G1, so as to receive the control signal CS1[n] through the gate line GL1[n] generated from the driver G1.

Similarly, the pixel circuit P2[1] is electrically coupled through the gate line GL2[1] to the driver G2, so as to receive the control signal CS2[1] through the gate line GL2[1] generated from the driver G2. And so on, the pixel circuit P2[n] is electrically coupled through the gate line GL2[n] to the driver G2, so as to receive the control signal CS2[n] through the gate line GL2[n] generated from the driver G2.

The connection relationship between the driver Gm and the pixel circuits Pm[1]~Pm[n] and the transmission manner of the corresponding control signals Csm[1]~CSm[n] are similar with the embodiment of the drivers G1, G2. Therefore, the description is omitted here.

Figure 5:
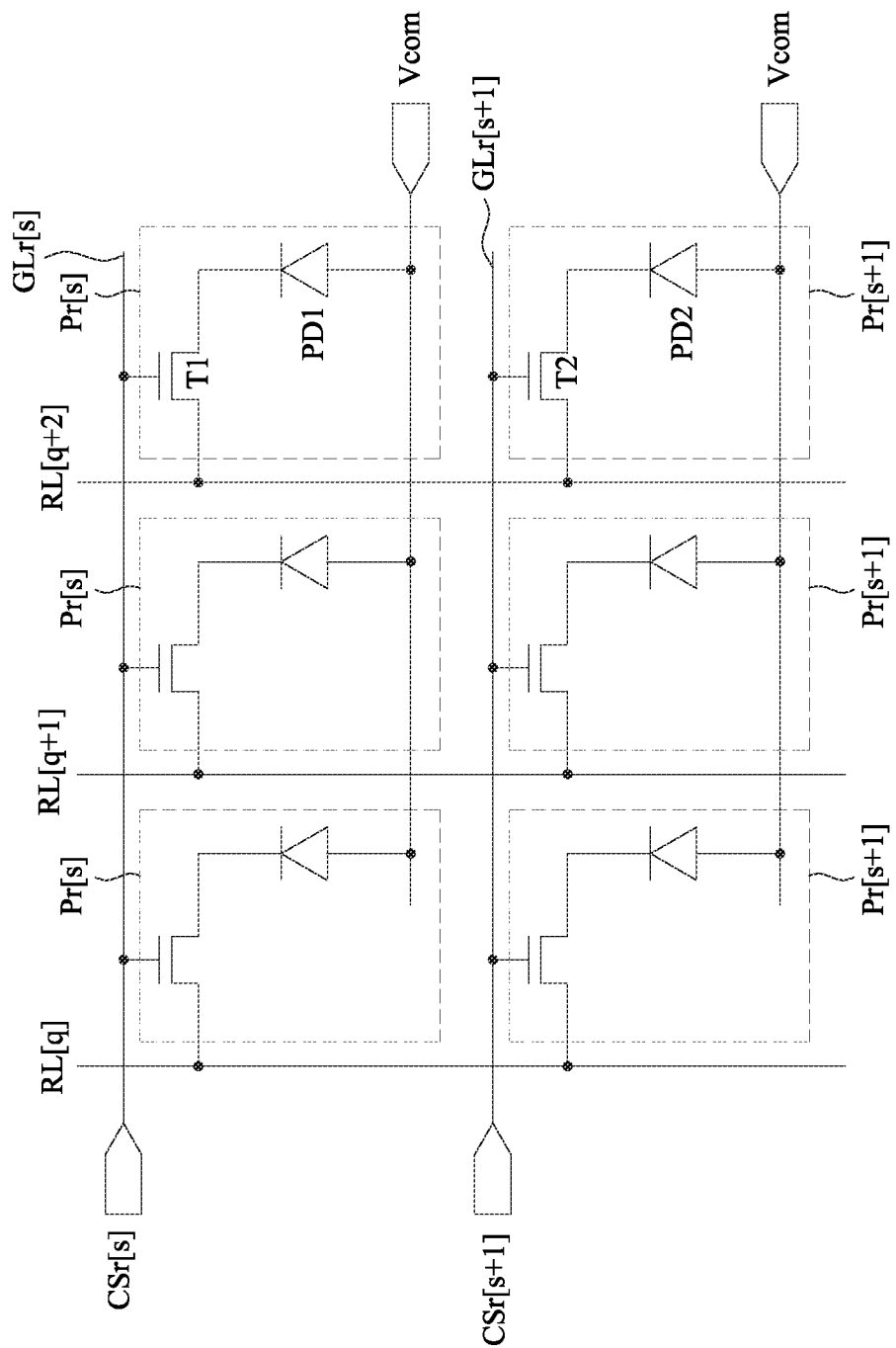
FIG. 5 is a schematic diagram of architecture of pixel circuits in accordance with one embodiment of the present disclosure.

Reference is made to FIG. 5, FIG. 5 is a schematic diagram of architecture of pixel circuits Pr[s] and Pr[s+1] in accordance with one embodiment of the present disclosure. The "s" said in the pixel circuits Pr[s] and Pr[s+1] can be implemented by any positive integer. And, each of the pixel circuits P1[1]~P1[n], P2[1]~P2[n] to Pm[1]~Pm[n] in FIGS. 4A and 4B can be implemented by one of the pixel circuits Pr[s], Pr[s+1] in FIG. 5.

As shown in FIG. 5, each of the pixel circuits Pr[s] includes a transistor T1 and a light sensing diode PD1. A second terminal of the light sensing diode PD1 is electrically coupled to the system voltage terminal Vcom. A first terminal of the light sensing diode PD1 is electrically coupled to a second terminal of the transistor T1.

First terminals of the transistors T1 included in the pixel circuits Pr[s] in the same line of the image sensor array 110 are respectively electrically coupled to a corresponding one of the read lines RL[q]~RL[q+1], and Gate terminals of the transistors T1 included in the pixel circuits Pr[s] in the same line of the image sensor array 110 are electrically coupled to the gate line GLr[s], configured to receive the control signal CSr[s], and the transistors T1 are turned on according to the control signal CSr[s], such that the voltage variations generate by the light sensing diodes PD1 after the exposure are transmitted through the read lines RL[q]~RL[q+1] to the corresponding readout circuit, such as the readout circuit READOUT[1].

Similarly, each of the pixel circuits Pr[s+1] includes a transistor T2 and a light sensing diode PD2. First terminals of the transistors T2 included in the pixel circuits Pr[s+1] in the same line of the image sensor array 110 are respectively electrically coupled to a corresponding one of the read lines RL[q]~RL[q+1], and Gate terminals of the transistors T2 included in the pixel circuits Pr[s+1] in the same line of the image sensor array 110 are electrically coupled to the gate line GLr[s+1], configured to receive the control signal CSr[s+1], and the transistors T2 are turned on according to the control signal CSr[s+1], such that the voltage variations generate by the light sensing diodes PD2 after the exposure are transmitted through the read lines RL[q]~RL[q+1] to the corresponding readout circuit, such as the readout circuit READOUT[1].

The aforesaid control signal CSr[s] corresponds to one of the control signals CS1[1]~CS1[n] of the embodiments in FIGS. 4A and 4B, therefore the description is omitted here.

In some embodiments, in a normal mode, all of the drivers G1~Gm provide the control signals CS1[1]~CS1[n], CS2[1]~CS2[n] to CSm[1]~CSm[n] to the gate lines CS1[1]~CSm[n] according to a clock rate, which is expressed as the first clock rate (e.g. 50 KHz) in the following embodiments, so as to sequentially scan the gate lines CS1[1]~CSm[n], and sequentially read and reset the voltage variations of the pixel circuit P1[1]~Pm[n] after the exposure, and generate a global image data. In some embodiments, the image sensor 100 outputs global image data as a frame of the first video image at a first rate in the normal mode.

Figure 6A:
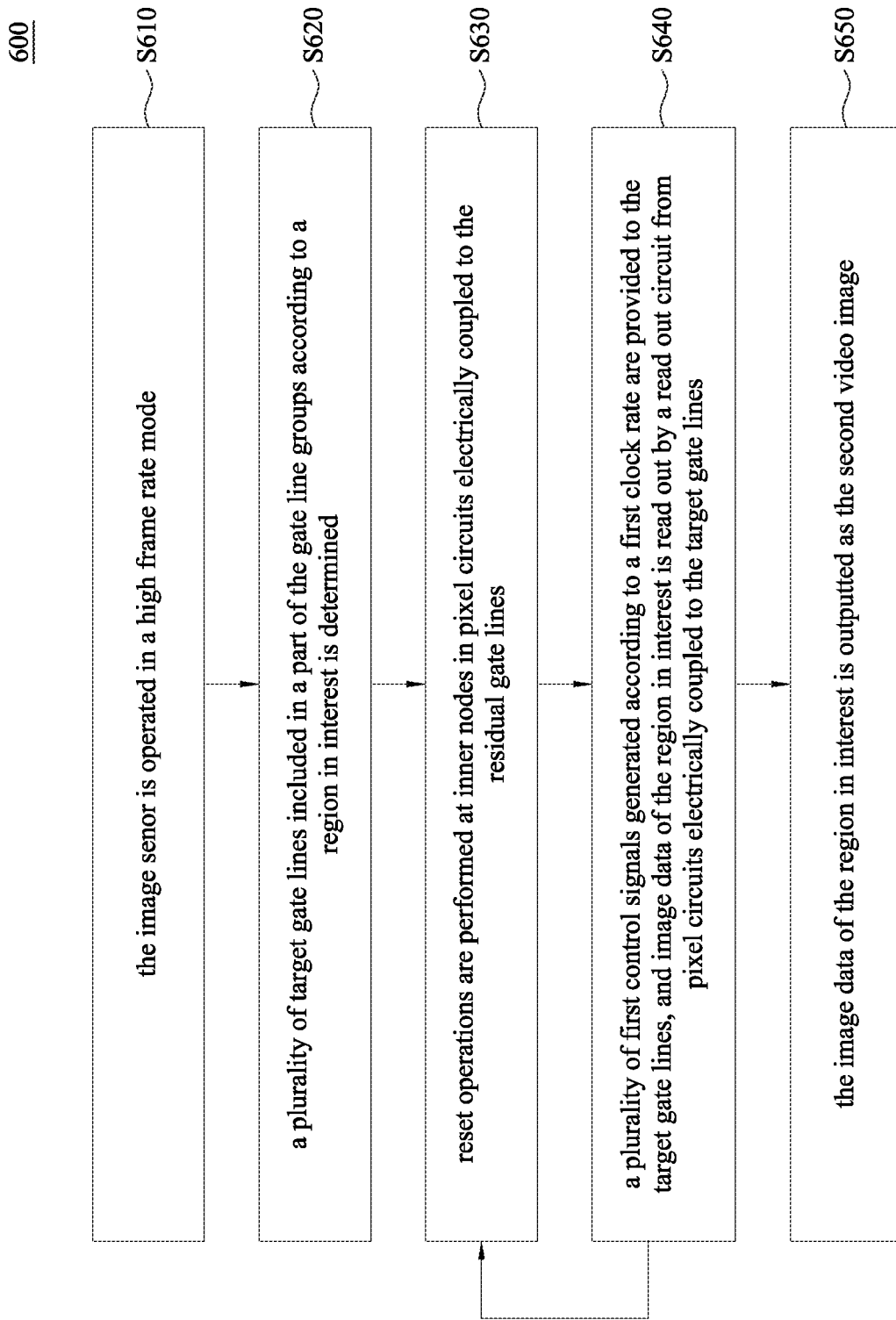
FIG. 6A is a schematic diagram of a flow chart of driving method in accordance with one embodiment of the present disclosure.
Figure 6B:
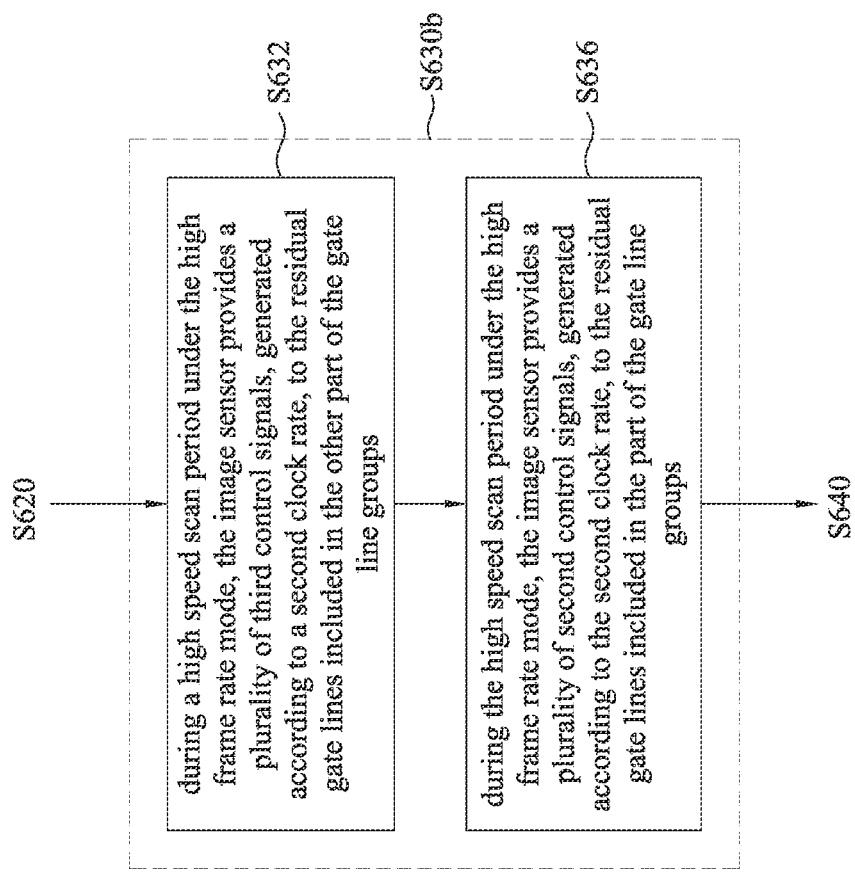
FIG. 6B is a schematic diagram of a flow chart of step S360b corresponding to step S630 included in driving method of FIG. 6A in accordance with one embodiment of the present disclosure.
Figure 6C:
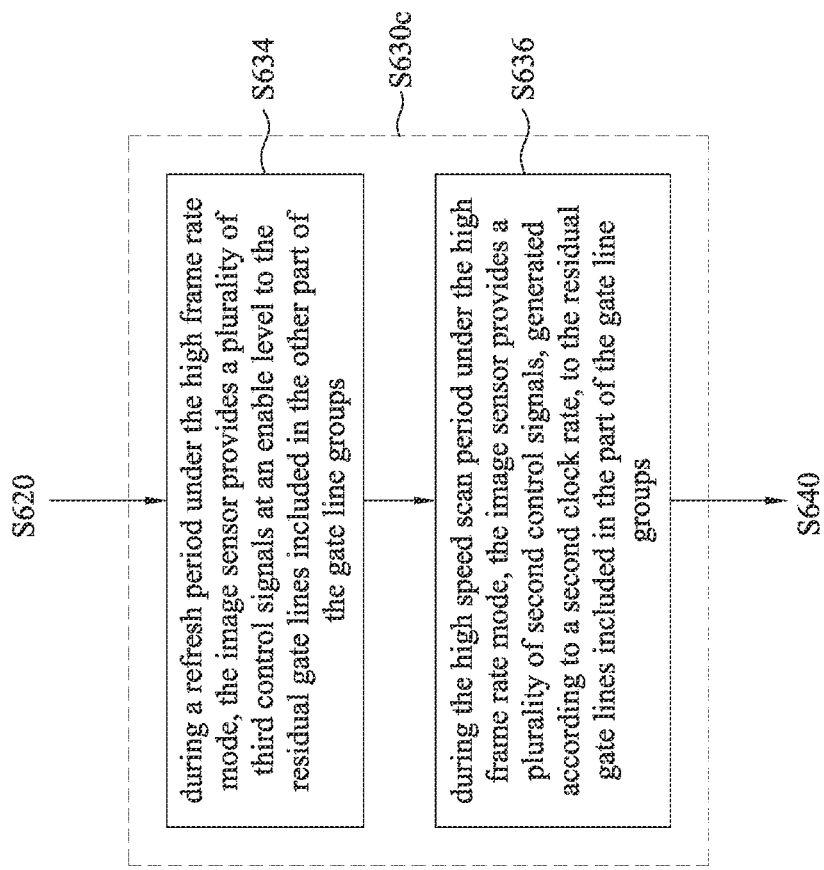
FIG. 6C is a schematic diagram of a flow chart of step S360c corresponding to step S630 included in driving method of FIG. 6A in accordance with one embodiment of the present disclosure.

In a high frame rate mode, the operations of the image sensor 100 are described in detail in the following embodiments. Reference is made to FIGS. 1 to 8. FIG. 6A is a schematic diagram of a flow chart of driving method 600 in accordance with one embodiment of the present disclosure. The driving method 600 includes steps S610~S650. FIG. 6B is a schematic diagram of a flow chart of step S360b corresponding to step S630 included in driving method 600 of FIG. 6A in accordance with one embodiment of the present disclosure. FIG. 6C is a schematic diagram of a flow chart of step S360c corresponding to step S630 included in driving method 600 of FIG. 6A in accordance with one embodiment of the present disclosure.

Figure 7:
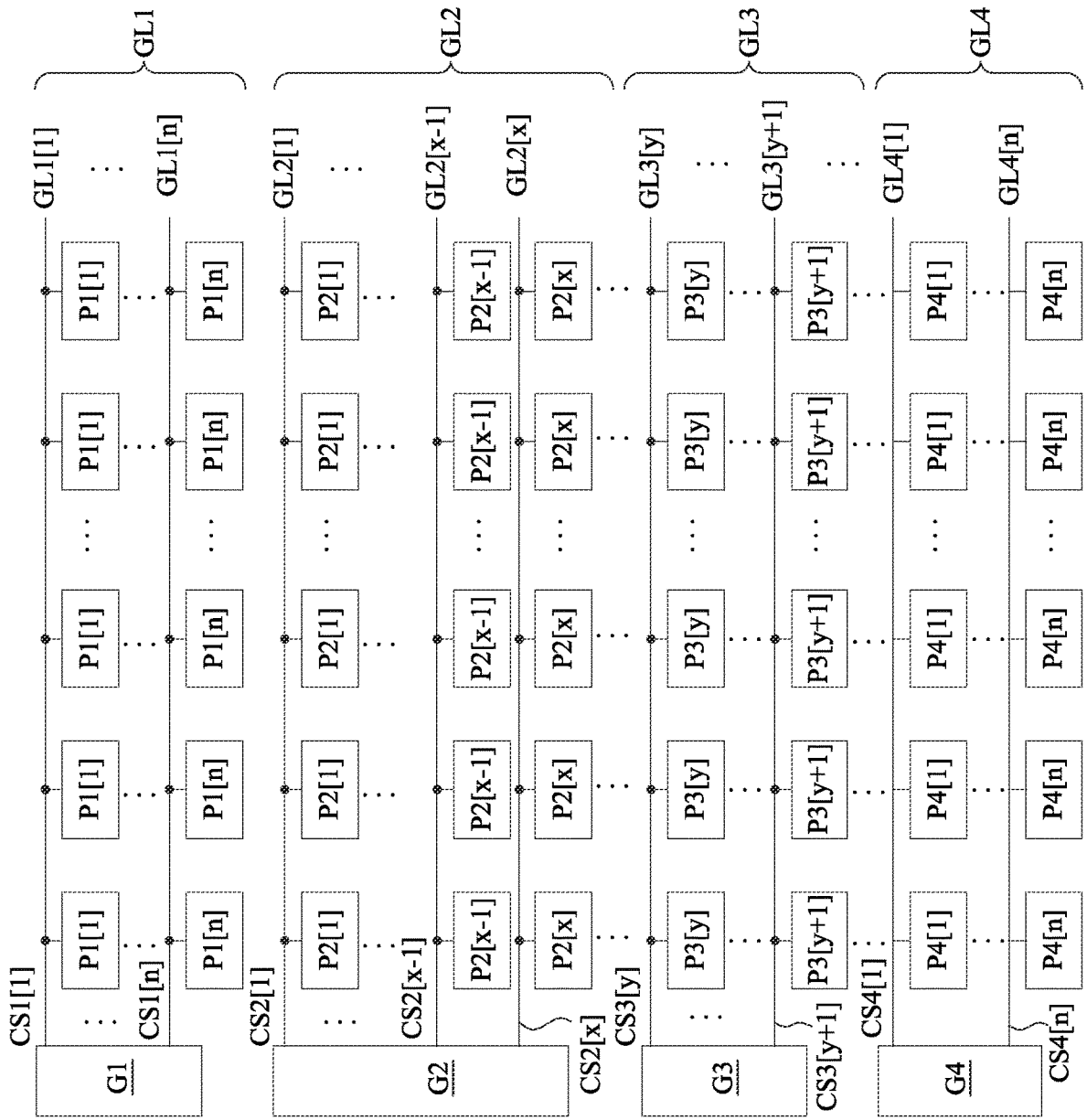
FIG. 7 is a schematic diagram of architecture between drivers, gate line groups and pixel circuits in accordance with one embodiment of the present disclosure.
Figure 8:
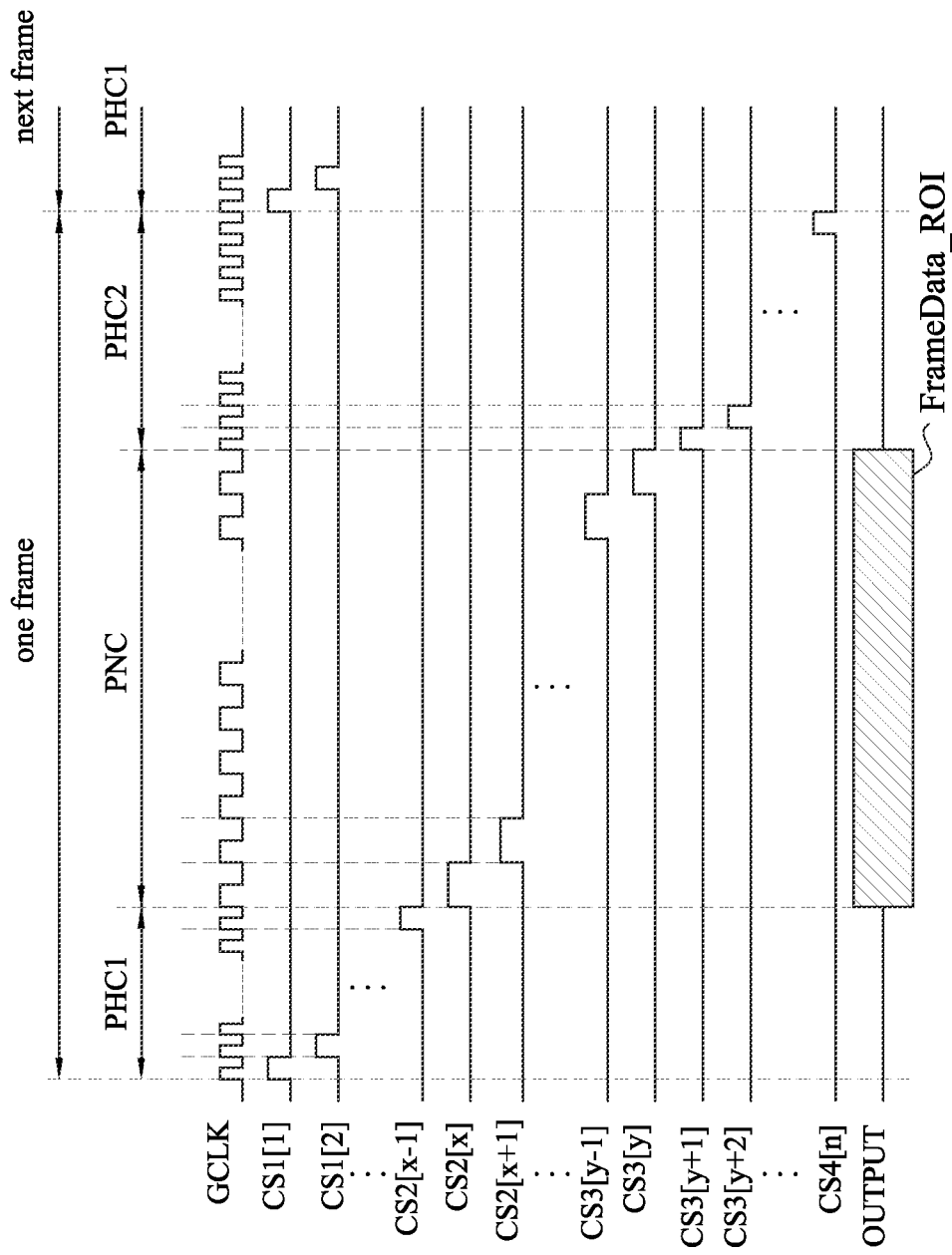
FIG. 8 is a timing diagram of first control signals, second control signals and third control signals provide by the drivers in FIG. 7 in accordance with one embodiment of the present disclosure.

FIG. 7 is a schematic diagram of architecture between drivers G1~G4, gate line groups GL1~GL4 and pixel circuits P1[1]~P4[n] in accordance with one embodiment of the present disclosure. To be noted that, in the following embodiments, for better understanding, a number of four drivers G1~G4 is for an example. However, the number of drivers can be implemented by any positive integer. Therefore, it is not intended to limit the present disclosure. FIG. 8 is a timing diagram of first control signals, second control signals and third control signals provide by the drivers G1~G4 in FIG. 7 in accordance with one embodiment of the present disclosure.

In step S610, the image sensor is operated in the high frame rate mode. In some embodiments, after the image sensor 100 is moved to the appropriate position by the user/machine arm, a region in interest ROI can be determined by the user, such as, the region in interest ROI for dental photography or chest X-ray photography. In some embodiments, the image sensor 100 can be operated in the high frame rate mode in response to a command transmitted from the electronic device 200, automatically.

In step S620, a plurality of target gate lines included in a part of the gate line groups according to a region in interest is determined. For example, if a scanning range of the region in interest ROI corresponds to gate lines GL2[x]~GL3[y] included in gate line groups GL2 and GL3 of the image sensor 100, the gate lines GL2[x]~GL3[y] can be considered as the target gate lines. And, gate lines GL2[1]~GL2[x−1] and GL3[y+1]~GL3[n] included in the gate line groups GL2 and GL3 can be considered as residual gate lines, and gate lines GL1[1]~GL1[n] and GL4[1]~GL4[n] included in residual gate line groups GL1 and GL4 can also be considered as the residual gate lines, as shown in FIG. 7.

In step, S630, reset operations are performed at inner nodes in pixel circuits electrically coupled to the residual gate lines. In the embodiments of FIG. 7, the drivers G1 and G4 are configured to provide control signals CS1[1]~CS1[n], CS4[1]~CS4[n] to the gate lines GL1[1]~GL1[n] and GL4[1]~GL4[n] included in the gate line groups GL1 and GL4. The control signals provided to the residual gate lines GL1[1]~GL1[n] and GL4[1]~GL4[n] included in the residual gate line groups GL1 and GL4 are expressed as third control signals in the following embodiments.

The drivers G2 and G3 are configured to provide control signals CS2[1]~CS2[x−1] and CS3[y+1]~CS3[n] to the residual gate lines GL2[1]~GL2[x−1] and GL3[y+1]~GL4[n] included in the gate line groups GL2 and GL3. The control signals CS2[1]~CS2[x−1] and CS3[y+1]~CS3[n] provided to the residual gate lines GL2[1]~GL2[x−1] and GL3[y+1]~GL4[n] included in the gate line groups GL2 and GL3 are expressed as second control signals in the following embodiments.

The drivers G2 and G3 are configured to provide the control signals CS2[x]~CS2[n] and CS3[1]~CS3[y] to the target gate lines GL2[x]~GL2[n] and GL3[1]~GL4[y] included in the gate line groups GL2 and GL3. The control signals CS2[x]~CS2[n] and CS3[1]~CS3[y] provided to the target gate lines GL2[x]~GL2[n] and GL3[1]~GL4[y] included in the gate line groups GL2 and GL3 are expressed as first control signals in the following embodiments.

In one embodiment of the present disclosure, step S630 in the driving method 600 can be implemented by step S630b in FIG. 6B. Step S630 includes steps S632 and S636.

In step S632, during a high speed scan period under the high frame rate mode, the image sensor provides a plurality of third control signals, generated according to a second clock rate, to the residual gate lines included in the other part of the gate line groups. For example, reference is made to FIG. 8, during the high speed scan periods PHC1 and PHC2 under the high frame rate mode of the image sensor 100, the drivers G1 and G4 provide the third control signals CS1[1]~CS1[n] and CS4[1]~CS4[n] generated according to a second clock rate to the gate lines GL1[1]~GL1[n] and GL4[1]~GL4[n] included in gate line groups GL1 and GL4, so as to perform the reset operation to the inner node of each pixel circuits P1[1]~P1[n] and P4[1]~P4[n] through the read lines RL[1]~RL[p] by the readout circuits READOUT[1]~READOUT[o]. The aforesaid inner node can be considered as a connection part between the light sensing diode PD1 and the transistor T1. The aforesaid second clock rate can be considered as a clock rate of the clock signal GCLK during the high speed scan periods PHC1 and PHC2. In some embodiments, the second clock rate is 200 KHz or other value larger than the first clock rate.

In this case, since the readout circuits READOUT[1]~READOUT[o] does not required to transmit/return sensing data during the high speed scan periods PHC1 and PHC2, the image sensor 100 can operated according to the second clock rate instead of the first clock rate which is slower, so as to reduce the scan time length.

In step, S636, during the high speed scan period under the high frame rate mode, the image sensor provides a plurality of second control signals, generated according to the second clock rate, to the residual gate lines included in the part of the gate line groups. For example, reference is made to FIG. 8, during the high speed scan period PHC1 and PHC2 under the high frame rate mode of the image sensor 100, the drivers G2 and G3 provide the second control signals CS2[1]~CS2[x−1] and CS3[y+1]~CS3[n] to the gate lines GL2[1]~ GL2[x−1] and GL3[y+1]~ GL3[n] included in the gate line groups GL2 and GL3 generated according to the second clock rate, so as to perform the reset operation to the inner node of each pixel circuits P2[1]~P2[x−1] and P3[y+1]~P3[n] through the read lines RL[1]~RL[p] by the readout circuits READOUT[1]~READOUT[o]. The aforesaid inner node can be considered as a connection part between the light sensing emitting diode PD1 and the transistor T1. The aforesaid second clock rate can be considered as a clock rate of the clock signal GCLK during the high speed scan periods PHC1 and PHC2. In some embodiments, the second clock rate is 200 KHz or other value larger than the first clock rate.

Similarly, in this case, since the readout circuits READOUT[1]~READOUT[o] does not required to transmit/return sensing data during the high speed scan periods PHC1 and PHC2, the image sensor 100 can operated according to the second clock rate instead of the first clock rate which is slower, so as to reduce the scan time length.

In step S640, a plurality of first control signal generated according to a first clock rate are provided to the target gate lines, and image data of the region in interest is read out by a read out circuit from pixel circuits electrically coupled to the target gate lines. During the normal scan period PNC under the high frame rate mode of the image sensor 100, the drivers G2~G3 provide the first control signals CS2[x]~CS2[n] and CS3[1]~CS3[y] generated according to the first clock rate to the corresponding gate lines GL2[x]~GL2[n] and GL3[1]~GL3[y], so as to sequentially scan the gate lines GL2[x]~GL2[n] and GL3[1]~GL3[y], such that voltage variations of the pixel circuits P2[x]~P2[n] and P3[1]~P3[y] after the exposure can be readout through the gate lines GL2[x]~GL2[n] and GL3[1]~GL3[y] by the readout circuit READOUT[1]~READOUT[o] to generate and output the image data FrameData_ROI of the region in interest ROI. In some embodiments, the first clock rate is 50 KHz or other value less than the second clock rate.

In step S650, the image data of the region in interest is outputted as the second video image. In some embodiments, the image sensor 100 outputs the image data FrameData_ROI of the image data FrameData_ROI as one frame of the second video image at a second frame rate. In some embodiments, the second frame rate of the second video image is 300 frame rate per second or the other value higher/larger than the first frame rate of the first video image. In some embodiments, since the second frame rate is higher/larger than the first frame rate of the first video image, the dynamic image outputted by the image sensor 100 in the high scan speed mode is much more realistic.

In some embodiments, in a case of observing blood or internal organs, if the smaller the region in interest ROI is selected, the driving method 600 can increase the frame rate greater. As a result, in some embodiments, the image sensor 100 in the high frame rate mode can achieve 300 FPS.

Figure 9:
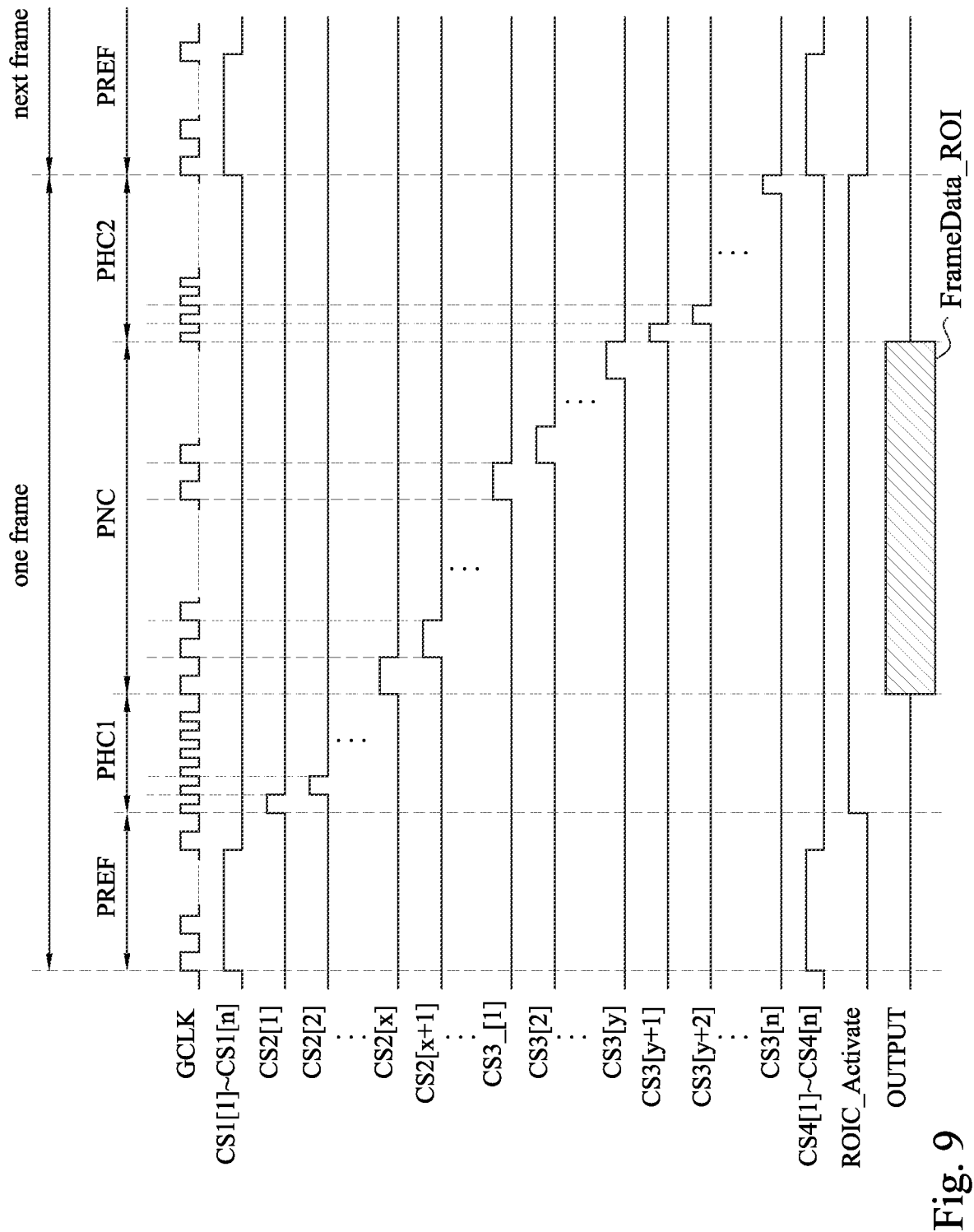
FIG. 9 is a timing diagram of first control signals, second control signals and third control signals provide by the drivers in FIG. 7 in accordance with one embodiment of the present disclosure.

In the other embodiment of the present disclosure, step S630 of the driving method 600 is implemented by step S630c of FIG. 6C, reference is made to FIGS. 4A~4B, 5, 60, 7-9. Step S630c includes steps S634 and S636. FIG. 9 is a timing diagram of first control signals CS2[x]~CS2[n] and CS3[1]~CS3[y], second control signals CS2[1]~CS2[x−1] and CS3[y+1]~CS3[n] and third control signals CS1[1]~CS1[n] and CS4[1]~CS4[n] provide by the drivers in FIG. 7 in accordance with one embodiment of the present disclosure.

In step S634, during a refresh period under the high frame rate mode, the image sensor provides a plurality of third control signals at an enable level to the residual gate lines included in the other part of the gate line groups. For example, during the refresh period PREF under the high frame rate mode of the image sensor 100, the drivers G1 and G4 generate the third control signals CS1[1]~CS1[n] and CS4[1]~CS4[n] at an enable level at the same time, and the drivers G1 and G4 provide the third control signals CS1[1]~CS1[n] and CS4[1]~CS4[n] to the gate lines GL1[1]~GL1[n] and GL4[1]~GL4[n] included in the gate line groups GL1 and GL4.

Meanwhile, since the enable signal ROIC_Activate has a low logic level, the readout circuit READOUT[1]~READOUT[o] does not performed the read operation to the pixel circuits P1[1]~P1[n] and P4[1]~P4[n], and the pixel circuits P1[1]~P1[n] and P4[1]~P4[n] are performed with the reset operation at the same time by the readout circuit READOUT[1]~READOUT[o].

To be noted that, during the refresh period PREF under the high frame rate mode, the time length of third control signals CS1[1]~CS1[n] and CS4[1]~CS4[n] at the enable level is multiple of inverse of the first clock rate. In other embodiments, the time length of third control signals CS1[1]~CS1[n] and CS4[1]~CS4[n] at the enable level is not multiple of inverse of the first clock rate. Therefore, it is not intend to limit the present disclosure.

As a result, since the pixel circuits P1[1]~P1[n] and P4[1]~P4[n] are reset at the same time, a time interval of one frame can be rapidly decreased, so as to increase the frame rate. Step S636 in FIG. 9 is similar to the step S636 in FIG. 8. Therefore, the description is omitted here.

Figure 10:
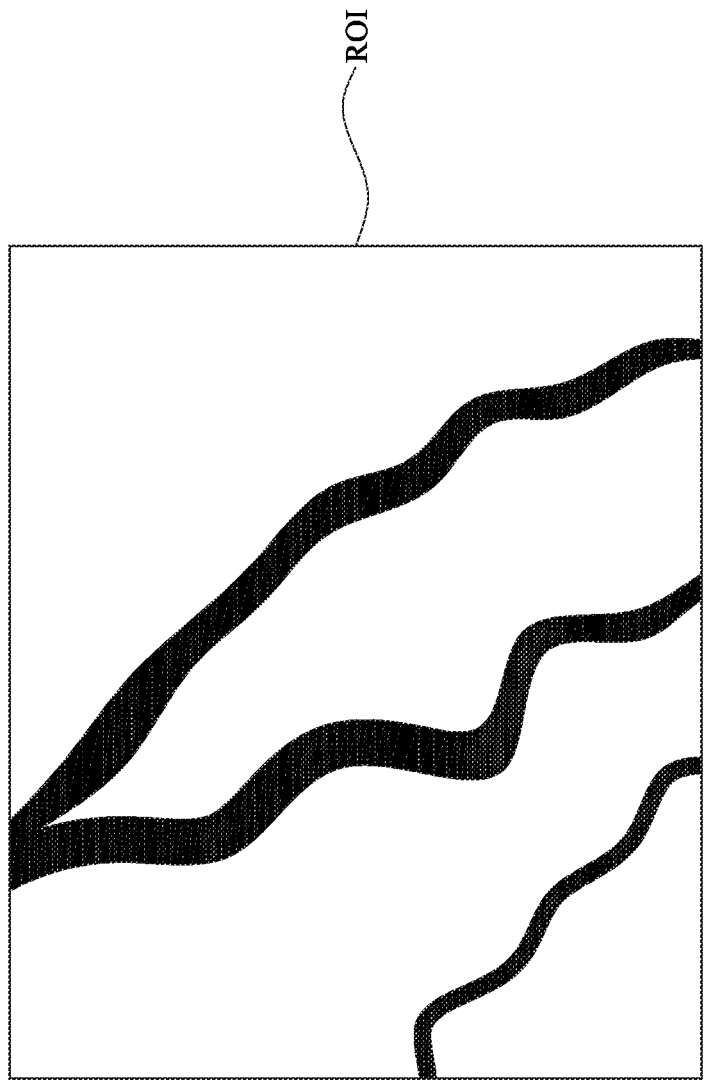
FIG. 10 is a schematic diagram of an image of one frame of the second video image outputted by the image sensor in accordance with one embodiment of the present disclosure.

Reference is made to FIG. 10, FIG. 10 is a schematic diagram of an image of one frame of the second video image outputted by the image sensor 100 in accordance with one embodiment of the present disclosure. As shown in FIG. 10, a sensing area of the image (such as, the region in interest ROI) outputted by the image sensor 100 operated in the high frame rate mode is small than a sensing image of the image outputted by the image sensor 100 operated in the normal mode. And, the image sensor 100 operated in the high frame rate mode outputs the image with a higher frame rate relatively to the image outputted by the image sensor 100 operated in the normal mode, and he the image sensor 100 operated in the high frame rate mode can improve leakage currents generated form the pixel circuits included in the non-target area, so as to provide the more realistic dynamic image.

Summary, the present disclosure utilizes the driving method 600 for driving the image sensor 100 to operate in the high frame rate mode, and the image sensor 100 operated in the high frame rate mode provide the high speed scan on a part of the gate lines included in the non-target area, such that the reset operation can be performed to the gate lines included in the non-target area, so as to increase the frame rate of the output image and the realistic of the image.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving method to drive an image sensor, wherein the image sensor comprises a plurality of gate line groups and a plurality of drivers respectively corresponding to the gate line groups, wherein each of the gate line groups comprises a plurality of gate lines, wherein each of the drivers is configured to provide control signals to gate lines comprised in a corresponding one of the gate line groups, wherein the driving method comprising:

during a normal scan period under a high frame rate mode, providing a plurality of first control signals generated by a part of the drivers according to a first clock rate to a plurality of target gate lines comprised in a part of the gate line groups; and during a high speed scan period under the high frame rate mode, providing a plurality of second control signals generated by the part of the drivers according to a second clock rate to a plurality of residual gate lines comprised in the part of the gate line groups, wherein the first clock rate is less than the second clock rate, and wherein the driving method further comprises one of following steps:

during the high speed scan period under the high frame rate mode, providing a plurality of third control signals generated by the other part of the drivers according to the second clock rate to a plurality of residual gate lines comprised in the other part of the gate line groups; or during a refresh period under the high frame rate mode, providing the third control signals at an enable level generated by the other part of the drivers to the residual gate lines comprised in the other part of the gate line groups.

2. The driving method of claim 1, wherein during the refresh period under the high frame rate mode, time length of the third control signals at the enable level is multiple of inverse of the first clock rate.

3. The driving method of claim 1, further comprising:

in a normal mode, providing the control signals generated by the drivers according to the first clock rate to the gate lines comprised in the gate line groups.

4. The driving method of claim 1, further comprising:

during the normal scan period under the high frame rate mode, transmitting a plurality of voltage variations, by a plurality of target pixel circuits electrically coupled to the target gate lines, through a plurality of read lines to a plurality of readout circuits according the first control signals; and reading out and resetting the voltage variations at inner nodes of each target pixel circuits by the readout circuits to generate image data of a region in interest.

5. The driving method of claim 4, further comprising:

during the high speed scan period under the high frame rate mode, resetting the voltage variations at the inner nodes of each target pixel circuits by the readout circuits.

6. The driving method of claim 4, further comprising:

in a normal mode, outputting a global image data as a first video image at a first frame rate by the image sensor; and in the high frame rate mode, outputting the image data of the region in interest as a second video image at a second frame rate by the image sensor, and wherein a sensing area corresponding to the global image data is larger than a sensing area corresponding to the image data of the region in interest.

7. The driving method of claim 6, wherein the first frame rate is less than the second frame rate.

8. A driving method to drive an image sensor, wherein the image sensor comprises a plurality of gate line groups and a plurality of drivers respectively corresponding to the gate line groups, wherein each of the gate line groups comprises a plurality of gate lines, wherein each of the drivers is configured to provide control signals to gate lines comprised in a corresponding one of the gate line groups, wherein the driving method comprising:

during a normal scan period under a high frame rate mode, providing a plurality of first control signals generated by a part of the drivers according to a first clock rate to a plurality of target gate lines comprised in a part of the gate line groups;

during a high speed scan period under the high frame rate mode, providing a plurality of third control signals generated by the other part of the drivers according to a second clock rate to a plurality of residual gate lines comprised in the other part of the gate line groups, wherein the first clock rate is less than the second clock rate; and during the high speed scan period under the high frame rate mode, providing a plurality of second control signals generated by the part of the drivers according to the second clock rate to a plurality of residual gate lines comprised in the part of the gate line groups.

9. An image sensor, comprising:

an image sensor array, comprising a plurality of gate line groups, each of the gate line groups comprises a plurality of gate lines; and a plurality of drivers, respectively corresponding to the gate line groups, each of the drivers is configured to provides a plurality of control signals to gate lines comprised in a corresponding one of the gate line groups, wherein:

during a normal scan period under a high frame rate mode, a part of the drivers generate a plurality of first control signals according to a first clock rate to a plurality of target gate lines comprised in a part of the gate line groups; and during a high speed scan period under the high frame rate mode, the part of the drivers generate a plurality of second control signals according to a second clock rate to a plurality of residual gate lines comprised in the part of the gate line groups, wherein the first clock rate is less than the second clock rate, and wherein the other part of the drivers configured to perform one of following steps:

during the high speed scan period under the high frame rate mode, generate a plurality of third control signals according to the second clock rate to a plurality of residual gate lines comprised in the other part of the gate line groups; or during a refresh period under the high frame rate mode, generate the third control signals at an enable level to the residual gate lines comprised in the other part of the gate line groups.

10. The image sensor of claim 9, wherein during the refresh period under the high frame rate mode, time length of the third control signals at the enable level is multiple of inverse of the first clock rate.

11. The image sensor of claim 9, wherein in a normal mode, the drivers provide the control signals according to the first clock rate to the gate lines comprised in the gate line groups.

12. The image sensor of claim 9, wherein:

during the normal scan period under the high frame rate mode, a plurality of target pixel circuits electrically coupled to the target gate lines transmit a plurality of voltage variations through a plurality of read lines to a plurality of readout circuits according the first control signals; and the readout circuits read out and resetting the voltage variations at inner nodes of each target pixel circuits to generate image data of a region in interest.

13. The image sensor of claim 12, wherein during the high speed scan period under the high frame rate mode, the readout circuits reset the voltage variations at the inner nodes of each target pixel circuits.

14. The image sensor of claim 13, wherein:

in a normal mode, the image sensor outputs a global image data as a first video image at a first frame rate; and in the high frame rate mode, the image sensor outputs the image data of the region in interest as a second video image at a second frame rate, and wherein a sensing area corresponding to the global image data is larger than a sensing area corresponding to the image data of the region in interest.

15. The image sensor of claim 14, wherein the first frame rate is less than the second frame rate.

* * * * *